(12) United States Patent
Muhanna et al.

(10) Patent No.: US 8,615,658 B2
(45) Date of Patent: *Dec. 24, 2013

(54) DYNAMIC FOREIGN AGENT—HOME AGENT SECURITY ASSOCIATION ALLOCATION FOR IP MOBILITY SYSTEMS

(71) Applicant: Apple Inc., Cupertino, CA (US)

(72) Inventors: Ahmad Muhanna, Richardson, TX (US); Mohamed Khalil, Murphy, TX (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/743,429

(22) Filed: Jan. 17, 2013

(65) Prior Publication Data

US 2013/0130655 A1    May 23, 2013

Related U.S. Application Data

(63) Continuation of application No. 12/450,405, filed as application No. PCT/US2008/003992 on Mar. 27, 2008, now Pat. No. 8,411,858.

(60) Provisional application No. 60/908,472, filed on Mar. 28, 2007, provisional application No. 60/916,866, filed on May 9, 2007.

(51) Int. Cl.
 *H04L 29/06* (2006.01)
 *H04L 9/32* (2006.01)
 *G06F 15/16* (2006.01)
 *G06F 15/173* (2006.01)
 *H04L 9/00* (2006.01)
 *H04K 1/00* (2006.01)

(52) U.S. Cl.
 USPC .............. 713/168; 380/44; 380/270; 380/274; 380/248; 709/202; 709/203; 709/225; 709/229; 709/250; 713/717; 713/153; 713/161

(58) Field of Classification Search
 USPC ........................................... 380/248; 713/168
 See application file for complete search history.

(56) References Cited

U.S. PATENT DOCUMENTS 6,466,964 B1    10/2002 Leung et al.
6,760,444 B1 *  7/2004 Leung ........................... 380/270
(Continued)

FOREIGN PATENT DOCUMENTS

EP          1 089 580          4/2001
WO     WO 2008118480 A1 * 10/2008 .............. H04W 8/06

OTHER PUBLICATIONS

Jian, Fu, "A Mobile IP Authentication Scheme Based on Key Distribution Center", Computer Engineering and Application, No. 23, 2003, pp. 142-144, the publication date is Nov. 14, 2003.

(Continued)

*Primary Examiner* — Carolyn B Kosowski
(74) *Attorney, Agent, or Firm* — Meyertons, Hood, Kivlin, Kowert & Goetzel, P.C.

(57) ABSTRACT

Utilizing the AAA infrastructure to dynamically allocate the various parameters needed to establish the security association between the Foreign Agent and the Home Agent. The present invention uses the AAA server as a central entity to dynamically generate and distribute the chosen security association parameters needed to support the Foreign Agent and Home Agent security association based on a request from the Foreign Agent. The AAA server can also dynamically assigns a unique SPI value to the Foreign Agent and Home Agent pairs. The various parameters that can be allocated in the present invention include a FA-HA shared secret key or a public/private key pair, an authentication algorithm and mode, a FA-HA secret key lifetime, and security parameter index or security index values. The present invention also can assist in making sure that the Foreign Agent and the Home Agent stay synchronized with respect to their security association.

28 Claims, 1 Drawing Sheet

(56) References Cited

U.S. PATENT DOCUMENTS

| | | | |
|---|---|---|---|
| 6,769,000 | B1 | 7/2004 | Akhtar et al. |
| 6,795,857 | B1 | 9/2004 | Leung et al. |
| 6,922,404 | B1 | 7/2005 | Narayanan et al. |
| 6,956,846 | B2 | 10/2005 | Lewis et al. |
| 7,079,499 | B1 | 7/2006 | Akhtar et al. |
| 7,080,151 | B1 | 7/2006 | Borella et al. |
| 7,107,620 | B2 | 9/2006 | Haverinen et al. |
| 7,168,090 | B2 * | 1/2007 | Leung ................. 726/4 |
| 7,174,018 | B1 | 2/2007 | Patil et al. |
| 7,193,985 | B1 | 3/2007 | Lewis et al. |
| 7,213,144 | B2 * | 5/2007 | Faccin et al. ............. 713/153 |
| 7,298,847 | B2 | 11/2007 | Jing et al. |
| 7,382,748 | B1 | 6/2008 | Bharatia et al. |
| 7,409,549 | B1 | 8/2008 | Leung et al. |
| 7,447,162 | B1 | 11/2008 | Leung et al. |
| 7,512,796 | B2 | 3/2009 | Haverinen et al. |
| 7,590,843 | B1 | 9/2009 | Khalil et al. |
| 7,639,802 | B2 | 12/2009 | Gundavelli et al. |
| 7,653,813 | B2 * | 1/2010 | Venkitaraman et al. ...... 713/169 |
| 7,808,970 | B2 * | 10/2010 | Narayanan et al. ........... 370/351 |
| 7,870,389 | B1 | 1/2011 | Leung et al. |
| 7,912,035 | B1 | 3/2011 | Leung et al. |
| 7,929,966 | B2 | 4/2011 | Iyer et al. |
| 7,934,094 | B2 * | 4/2011 | Oyama ................. 713/168 |
| 8,140,845 | B2 | 3/2012 | Buddhikot et al. |
| 8,165,290 | B2 | 4/2012 | Gundavelli et al. |
| 8,195,778 | B1 | 6/2012 | Leung et al. |
| 8,411,858 | B2 * | 4/2013 | Muhanna et al. ............. 380/248 |
| 8,505,088 | B2 * | 8/2013 | Khalil et al. ................. 726/15 |
| 2002/0012433 | A1 | 1/2002 | Haverinen et al. |
| 2002/0080752 | A1 | 6/2002 | Johansson et al. |
| 2003/0033518 | A1 * | 2/2003 | Faccin et al. .............. 713/153 |
| 2003/0147537 | A1 | 8/2003 | Jing et al. |
| 2004/0032844 | A1 | 2/2004 | Lewis et al. |
| 2005/0063352 | A1 * | 3/2005 | Amara et al. ................. 370/338 |
| 2005/0190734 | A1 | 9/2005 | Khalil et al. |
| 2005/0237983 | A1 | 10/2005 | Khalil et al. |
| 2006/0072759 | A1 | 4/2006 | Gundavelli et al. |
| 2006/0294363 | A1 * | 12/2006 | Bae et al. ................ 713/153 |
| 2007/0060106 | A1 | 3/2007 | Haverinen et al. |
| 2007/0124592 | A1 * | 5/2007 | Oyama ................ 713/171 |
| 2007/0206557 | A1 | 9/2007 | Iyer et al. |
| 2009/0116651 | A1 | 5/2009 | Liang et al. |
| 2009/0133102 | A1 | 5/2009 | Wen et al. |
| 2009/0172403 | A1 * | 7/2009 | Liang et al. ................ 713/171 |
| 2009/0233578 | A1 | 9/2009 | Feder et al. |
| 2009/0313692 | A1 | 12/2009 | Khalil et al. |
| 2010/0088400 | A1 | 4/2010 | Andreasen et al. |
| 2010/0106969 | A1 | 4/2010 | Muhanna et al. |
| 2010/0106971 | A1 | 4/2010 | Premec |
| 2010/0107235 | A1 | 4/2010 | Premec |
| 2010/0161986 | A1 | 6/2010 | Bucker et al. |
| 2010/0166179 | A1 | 7/2010 | Gundavelli et al. |
| 2010/0303006 | A1 | 12/2010 | Fernandez Gutierrez |
| 2013/0130655 | A1 * | 5/2013 | Muhanna et al. ............. 455/411 |

OTHER PUBLICATIONS

Shixiong, Zhu, "Discussion of Application of AAA in mobile IP", Information Security and Secure Communication, vol. 7, 2005, pp. 152-155, the publication date is Jul. 31, 2005.

Decision on Rejection issued by Chinese Patent Office for Chinese Patent Application No. 200880009791.7 (English Translation), Sep. 5, 2012, pp. 1-19.

Maughan, D. et al., Network Working Group, Request for Comments: 2408, Internet Security Association and Key Management Protocol (ISAKMP), Nov. 1998.

\* cited by examiner

US 8,615,658 B2

DYNAMIC FOREIGN AGENT—HOME AGENT SECURITY ASSOCIATION ALLOCATION FOR IP MOBILITY SYSTEMS

RELATED APPLICATION DATA

This application is a continuation of U.S. patent application Ser. No. 12/450,405, filed Sep. 24, 2009 which is a Submission Under 35 U.S.C. §371 for U.S. National Stage Patent Application PCT/IB2008/003992, filed Mar. 27, 2008, which claims priority to Provisional Patent Application Ser. No. 60/908,472, filed on Mar. 28, 2007, and Provisional Patent Application Ser. No. 60/916,866, filed on May 9, 2007, all of which are incorporated by reference in their entirety as if fully and completely set forth herein.

TECHNICAL FIELD OF THE INVENTION

A system and method for any IP-based system, including an IP-based mobile communication system having a home network, foreign network and a mobile node.

BACKGROUND OF THE INVENTION

IP-based mobile system includes at least one Mobile Node in a wireless communication system. The term "Mobile Node" includes a mobile communication unit, and, in addition to the Mobile Node, the communication system has a home network and a foreign network. The Mobile Node may change its point of attachment to the Internet through these other networks, but the Mobile Node will always be associated with a single home network for IP addressing purposes. The home network has a Home Agent and the foreign network has a Foreign Agent—both of which control the routing of information packets into and out of their network.

The Mobile Node, Home Agent and Foreign Agent may be called other names depending on the nomenclature used on any particular network configuration or communication system. For instance, a "Mobile Node" encompasses PC's having cabled (e.g., telephone line ("twisted pair"), Ethernet cable, optical cable, and so on) connectivity to the wireless network, as well as wireless connectivity directly to the cellular network, as can be experienced by various makes and models of mobile terminals ("cell phones") having various features and functionality, such as Internet access, e-mail, messaging services, and the like. And, a home agent may be referred to as a Home Agent, Home Mobility Manager, Home Location Register, and a foreign agent may be referred to as a Foreign Agent, Serving Mobility Manager, Visited Location Register, and Visiting Serving Entity. The terms Mobile Node, Home Agent and Foreign Agent are not meant to be restrictively defined, but could include other mobile communication units or supervisory routing devices located on the home or foreign networks.

The Mobile Node keeps the Home Agent informed as to its current location by registering a "care-of address" with the Home Agent. Essentially, the care-of address represents the current foreign network where the Mobile Node is located. If the Home Agent receives an information packet addressed to the Mobile Node while the Mobile Node is located on a foreign network, the Home Agent will transmit the information packet to the Mobile Node's current location on the foreign network using the applicable care-of address.

The Foreign Agent participates in informing the Home Agent of the Mobile Node's current care-of address. The Foreign Agent also receives the information packets for the Mobile Node after the information packets have been forwarded by the Home Agent. Further, the Foreign Agent serves as a default router for out-going information packets generated by the Mobile Node while connected to the foreign network.

Foreign Agents and Home Agents periodically broadcast an agent advertisement to all nodes on the local network associated with that agent. An agent advertisement is a message from the agent on a network that may be issued under the Mobile IP protocol (RFC 2002) or any other type of communications protocol. This advertisement should include information that is required to uniquely identify a mobility agent (e.g. a Home Agent, a Foreign Agent, etc.) to a mobile node. Mobile Nodes examine the agent advertisement and determine whether they are connected to the home network or a foreign network.

If the Mobile Node is located on its home network, information packets will be routed to the Mobile Node according to the standard addressing and routing scheme. If the Mobile Node is visiting a foreign network, however, the Mobile Node obtains appropriate information from the agent advertisement, and transmits a registration request message to its Home Agent through the Foreign Agent. The registration request message will include a care-of address for the Mobile Node.

The registered care-of address identifies the foreign network where the Mobile Node is located, and the Home Agent uses this registered care-of address to forward information packets to the foreign network for subsequent transfer to the Mobile Node. A registration reply message may be sent to the Mobile Node by the Home Agent to confirm that the registration process has been successfully completed.

Upon moving to a new network, a mobile node detects its movement by receipt of a Router Advertisement message from a new router or exceeding the time interval for receiving an expected Router Advertisement message from a linked router. A mobile node can also periodically transmit a Router Solicitation message that will be received by a router on the foreign network and initiate transmission of a Router Advertisement message received by the mobile node.

The Router Advertisement message contains network prefix information that is used to form a care-of address for routing information packets from the home network to the mobile node on the foreign network. A Registration Request or Binding Update message (BU) is used to register the care-of address with the home agent and any active correspondence node communicating with the mobile node. The new Registration Request includes the care-of address, the home address, and a binding lifetime. A Registration Reply or Binding Acknowledgment message (BA) is sent in response to the Request or Binding Update message to either accept or reject the Binding Update as an authentication step. Routers on the networks will maintain the care-of address and home IP address association for the mobile node on a data table, ensuring that information packets can be routed to a mobile node connected to the foreign network.

In an IP-based mobile communication system, the Mobile Node changes its point of attachment to the network while maintaining network connectivity. The Mobile IP Protocol (RFC 2002) assumes that mobile IP communications with a Mobile Node will be performed on a single administrative domain or a single network controlled by one administrator. When a Mobile Node travels outside its home administrative domain, however, the Mobile Node may need to communicate through multiple foreign networks in order to maintain network connectivity with its home network. While connected to a foreign network controlled by another administrative domain, network servers must authenticate, authorize and collect accounting information for services rendered to the Mobile Node. These authentication, authorization, and accounting activities are called "AAA" activities.

Authentication is the process of proving someone's claimed identity, and security systems on a mobile IP network will often require authentication of the system user's identity before authorizing a requested activity. An AAA server on the networks authenticates the identity of an authorized user, and authorizes the Mobile Node's requested activity. Additionally, the AAA server will also support the accounting function, including tracking usage and charges for use of transmission links between administrative domains.

Remote Authentication Dial In User Service (RADIUS) is one widely utilized protocol for AAA. The RADIUS protocol defines message formats and data required for AAA that can be used on virtually any packet-based communication system. Functionally, RADIUS can perform client-server operations, network security, authentication, and accounting using standard information encoding under a UDP transmission protocol. RADIUS AAA server computers are widely deployed over wireless networks utilizing the RADIUS protocol to perform AAA functions.

Another function for the AAA server is to support secured transmission of information packets by storing and allocating security associations. Security associations refer to those encryption protocols, nonces, and keys required to specify and support encrypting an information packet transmission between two nodes in a secure format. The security associations are a collection of security contexts existing between the nodes that can be applied to the information packets exchanged between them. Each context indicates an authentication algorithm and mode, a shared key or appropriate public/private key pair, and a style of replay protection.

Extensions have been defined in the IP protocol, and extensions can be used in similar protocols, to support transmission of variable amounts of data in an information packet. This includes address information for mobile nodes, routers, and networks. The extension mechanism in IP permits appropriate addressing and routing information to be carried by any information packet, without restriction to dedicated message types such as discovery, notification, control, and routing information packet formats.

The general extension format includes a Type-Length-Value format. The Type data field (T) 1 occupies the first 8-bits (one octet) of the general extension. The value of this data field will designate the type of extension. The Length data field (L) 2 occupies the next 8-bits of the extension, and the value assigned is the length of the Value field (V) 3 in octets. The Value data field 3 occupies the remaining bits in the general extension as specified by the Type 1 and Length 2 data values.

Several functionalities in Mobile IPv4 require the Foreign Agent to add specific information to a Registration Request RRQ received from a Mobile Node before that Registration Request RRQ is forwarded to the Home Agent. This additional information should be protected from public disclosure, which requires the Foreign Agent to establish a security association with the Home Agent before the transmission of the RRQ to the Home Agent.

The Foreign Agent-Home Agent Authentication Extension (AE) is an optional extension that can be used to support secure communications between foreign and home networks. The use of the FA-HA Authentication Extension (AE) requires the presence of a security association between the Foreign Agent FA and the Home Agent HA. In order to establish the security association between the Foreign Agent and the Home Agent to support the FA-HA Authentication Extension (AE), the Foreign Agent must be able to dynamically allocate the security association parameters (e.g. FA-HA secret key, hash function, hash function mode, etc.) in the FA-HA access request message that will establish the security association between the Foreign Agent and the Home Agent.

The Foreign Agent and the Home Agent also index their security associations using a Security Parameters Index (SPI), and the Foreign Agent and the Home Agent also transmit IP addresses of the Mobile Node as an index for the security association between the Foreign Agent and the Home Agent. The allocation of this FA-HA security association is outside the scope of RFC 2002 (3344), and there is not a capability to dynamically allocate the necessary supporting information for the FA-HA security association at the present time. That is one objective of the present invention. Another objective is to support the dynamic allocation of parameters used in the FA-HA security association, with variable combinations and expansion of parameters that were statically pre-configured previously. There is a method proposed in the 3GPP2 standard to dynamically allocate a single secret key value using a AAA server, but this proposal does not maintain the synchronicity between the Foreign Agent and the Home Agent and does not allow for the dynamic allocation of other necessary parameters or security parameter index values.

SUMMARY OF THE INVENTION

The present invention utilizes the AAA infrastructure to dynamically allocate the various parameters needed to establish the security association between the Foreign Agent and the Home Agent. The various parameters that can be allocated in the present invention include a FA-HA shared secret key or a public/private key pair, an authentication algorithm and mode, a FA-HA secret key lifetime, and security parameter index or security index values. The present invention also can assist in making sure that the Foreign Agent and the Home Agent stay synchronized with respect to their security association.

The present invention uses the AAA server as a central entity to dynamically generate and distribute the chosen security association parameters needed to support the Foreign Agent and Home Agent security association based on a request from the Foreign Agent. The AAA server can also dynamically assigns a unique SPI value to the Foreign Agent and Home Agent pairs. After dynamically allocating the necessary parameters and establishing the FA-HA security association, the Foreign Agent can forward the Initial Registration Request from the Mobile Node to its Home Agent on the home network.

BRIEF DESCRIPTION OF THE DRAWINGS

The objects and features of the invention will become more readily understood from the following detailed description and appended claims when read in conjunction with the accompanying drawings in which like numerals represent like elements and in which:

DETAILED DESCRIPTION OF THE PREFERRED EMBODIMENTS

Figure 1:
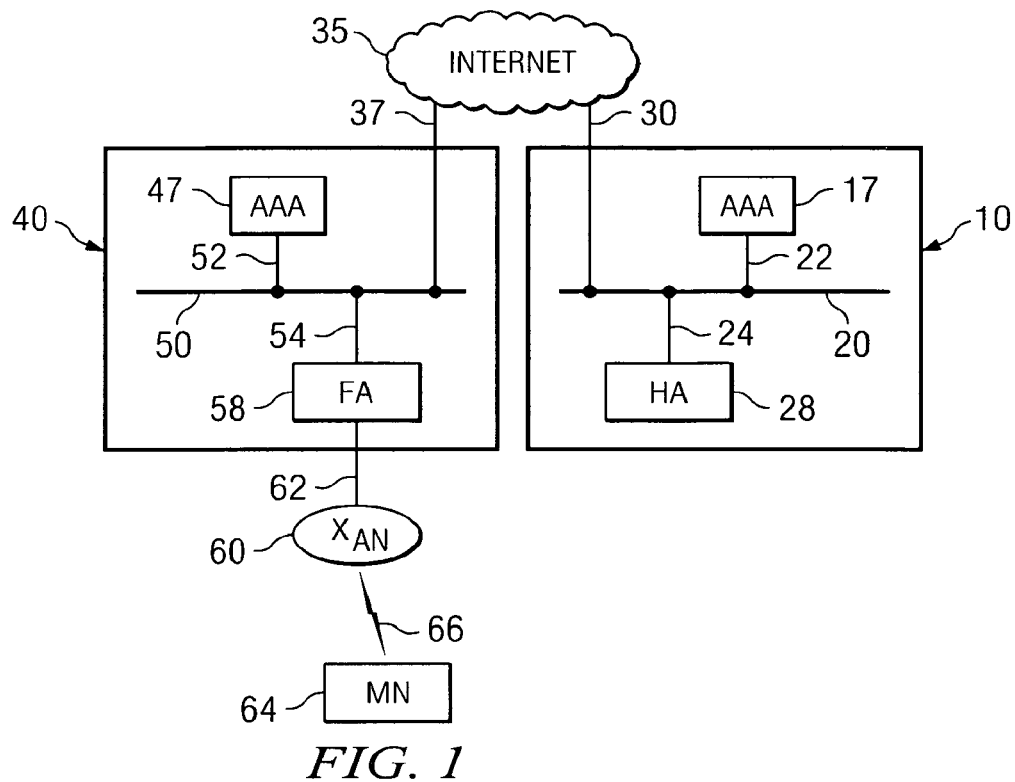
FIG. 1 is a mobile IP-based communication system.

In FIG. 1, the overall architecture of the IP-based mobile system is shown with a Mobile Node 64, a home network 10 and a foreign network 40. As shown in FIG. 1, the home network 10 and the foreign network 40 are coupled to the Internet represented by the cloud 35. The home network 10 has a central buss line 20 coupled to the Home Agent 28 via communication link 24. The buss line 20 is coupled to the AAA server 17 via communication link 22. The home network 10 is coupled to the Internet 35 via communication link 30. A communications link is any connection between two or more nodes on a network or users on networks or administrative domains.

The foreign network 40 has a central buss line 50 coupled to the foreign agent 58 via communication link 54. The buss line 50 is coupled to the AAA foreign network server 47 via communication link 52. The foreign network 40 is coupled to the Internet 35 via communication link 37. Mobile Node 64 is shown electronically coupled to the foreign network 40 via the wireless communication link 66 of transceiver 60. Transceiver 60 is coupled to the foreign network 40 via communication link 62. The Mobile Node 64 can communicate with any transceiver or Access Network coupled to the foreign network 40.

The terms Home Agent and Foreign Agent may be as defined in the Mobile IP Protocol (RFC 2002), but these agents are not restricted to a single protocol or system. In fact, the term Home Agent, as used in this application, can refer to a Home Mobility Manager, Home Location Register, Home Serving Entity, or any other agent at a home network 10 having the responsibility to manage mobility-related functionality for a Mobile Node 64. Likewise, the term Foreign Agent, as used in this application, can refer to a Serving Mobility Manager, Visited Location Register, Visiting Serving Entity, or any other agent on a foreign network 40 having the responsibility to manage mobility-related functionality for a Mobile Node 64.

In the mobile IP communications system shown in FIG. 1, the Mobile Node 64 is identified by a permanent IP address. While the Mobile Node 64 is coupled to its home network 10, the Mobile Node 64 receives information packets like any other fixed node on the home network 10. When mobile, the Mobile Node 64 can also locate itself on foreign network 40. When located on foreign network 40, the home network 10 sends data communications to the Mobile Node 64 by "tunneling" the communications to the foreign network 40.

The Mobile Node 64 keeps the Home Agent 28 informed of its current location, or foreign network association, by registering a care-of address with the Home Agent 28. Essentially, the care-of address represents the foreign network 40 where the Mobile Node 64 is currently located. If the Home Agent 28 receives an information packet addressed to the Mobile Node 64 while the Mobile Node 64 is located on a foreign network 40, the Home Agent 28 will "tunnel" the information packet to foreign network 40 for subsequent transmission to Mobile Node 64.

The Foreign Agent 58 participates in informing the Home Agent 28 of the Mobile Node's 64 current care-of address. The Foreign Agent 58 also receives information packets for the Mobile Node 64 after the information packets have been forwarded to the Foreign Agent 58 by the Home Agent 28. Moreover, the Foreign Agent 58 serves as a default router for out-going information packets generated by the Mobile Node 64 while connected to the foreign network 40.

The Mobile Node 64 participates in informing the Home Agent 28 of its current care-of address. When the Mobile Node 64 is visiting a foreign network 40, the Mobile Node 64 obtains appropriate information regarding the address of the foreign network 40 and/or the Foreign Agent 58 from an agent advertisement. After obtaining this information, the Mobile Node 64 transmits the registration request to the Foreign Agent 58, which prepares the registration request message for forwarding to the Home Agent 28.

Mobile IP protocols require that the mobile node register the care-of address with the Home Agent 28 on the home network 10 after movement to a new foreign network 40. As part of the registration process, the Mobile Node 64 issues a registration request in response to power-up on the foreign network 40 or receipt of an agent advertisement. The registration request is sent to the Home Agent 28 on the home network 40, but only after the security association is established between the Foreign Agent 58 and the Home Agent 28.

After the security association is established, a registration request message can be sent to the Home Agent 28 that includes a care-of address for the Mobile Node 64. A registration reply is issued by the Home Agent 28 to acknowledge receipt of the registration request, confirm receipt of the care-of address for the Mobile Node 64, and indicate completion of the registration process. The care-of address identifies the foreign network 40 where the Mobile Node 64 is located, and the Home Agent 28 uses this care-of address to tunnel information packets to the foreign network 40 for subsequent transfer to the Mobile Node 64.

All communications addressed to the Mobile Node 64 are routed according to normal IP protocols to the mobile node's home network 10. After registration is completed, the Home Agent 28 receives this communication and "tunnels" the message to the Mobile Node 64 on the foreign network 40. The Foreign Agent 58 accepts the re-directed communication and delivers the information packet to the Mobile Node 64 through the transceiver 60. In this manner, the information packets addressed to the Mobile Node 64 at its usual address on the home network 10 is re-directed or forwarded to the Mobile Node 64 on the foreign network 40.

Without a security association, the above information would be sent in the public domain. But, sending such information in the public domain without a security association can subject authorized users to the following forms of attack: (1) session stealing where a hostile node hijacks the network session from mobile node by redirecting information packets, (2) spoofing where the identity of an authorized user is utilized in an unauthorized manner to obtain access to the network, and (3) eavesdropping and stealing information during a session with an authorized user. The present invention prevents that from occurring by dynamically establishing security association parameters prior to the transmission of information from the Foreign Agent 58 to the Home Agent 28.

The AAA Server

AAA Server 17 provides authentication and authorization services for users on their home network 10 and Mobile Node 64 when connected to foreign network 40. The present invention utilizes the AAA Server 17 and its surrounding infrastructure to dynamically allocate the various parameters needed to establish the security association between the Foreign Agent 58 and the Home Agent 28.

The AAA Server 17 is the central entity in the present invention, and the AAA Server 17 dynamically generates and distributes the chosen parameters needed to establish the security association between the Foreign Agent 58 and the Home Agent 28 before the registration request is transmitted to the Home Agent 28 by the Foreign Agent 58. The various parameters that can be allocated in the present invention include a FA-HA shared secret key or a public/private key pair, an authentication algorithm and mode, a FA-HA secret key lifetime, a replay protection mechanism (if necessary), security parameter index (SPI) or security index values, as well as any other needed parameters that can be defined in the future.

A security parameter index (SPI) identifies a security context between a pair of nodes available in the mobility security association. Each designated security context indicates an authentication algorithm and mode, a public or private key ("secret key"), and a style of replay protection. An SPI is found in all authentication extensions and must be used to authenticate the identity of the mobile node. The SPI designates the security protocol (algorithm and keys) to compute the authenticator value.

The present invention uses the AAA server as a central entity to dynamically generate and distribute the chosen security association parameters needed to support the Foreign Agent and Home Agent security association based on a request from the Foreign Agent. The AAA server can also dynamically assigns a unique SPI value to the Foreign Agent and Home Agent pairs. After dynamically allocating the necessary parameters and establishing the FA-HA security association, the Foreign Agent forwards the Initial Registration Request from the Mobile Node to its Home Agent on the home network.

The AAA Server 17 maintains a state for the newly generated security association and the SPI value for the FA-HA pair. The AAA Server 17 may be a RADIUS AAA server which is capable of processing RADIUS Access Requests from the Foreign Agent 58, generating dynamically parameters needed to establish a security association, and transmitting those parameters back to the Foreign Agent 58 in a RADIUS Access Accept message prior to the Foreign Agent 58 forwarding the Registration Request to the Home Agent 28.

The present invention also assists in ensuring that the Foreign Agent and the Home Agent maintains a synchronized security association. The present invention accomplishes this objective by requiring that, at any time the Foreign Agent 58 requests access and a security association with a specified Home Agent 28, the AAA Server 17 must generate a new Security Parameter Index (SPI) for that security association even if a security association already exists or an existing security association has not expired. This requirement that a new Security Parameter Index (SPI) get generated upon each new request for a security association that designates a specific Home Agent 28 can be used to indicate that a new security association has been dynamically established and the Home Agent 28 must acquire the new security association parameters from the AAA Server 17 in order to continue to communicate with the Mobile Node 64 through the Foreign Agent 58.

The requirement that a new security parameter generation or SPI value allocation must be performed if the Foreign Agent 58 specifies the FA-HA pair that needs the security association established, and this dynamic allocation will occur even if the Foreign Agent 58 requests a security association and includes an old SPI value in its access request. The AAA Server 17, being the controlling entity that dynamically allocates the security parameter values, must allocate the new security parameter values each time a security association is requested in an access request message by the Foreign Agent 58 with respect to a specified Home Agent 28. After providing the security association information to the Foreign Agent 58, the Foreign Agent will communicate to the Home Agent 28, which will make an inquiry to the AAA Server 17 for the security parameter information dynamically allocated and previously sent to the Foreign Agent 58. Once the AAA Server 17 receives a request from the Home Agent 28 for a specific FA-HA security association with a specific valid SPI value (as received from the Foreign Agent 58), the AAA Server 17 must return back to the Home Agent 28 the security association parameters including the FA-HA secret key associated with the specified SPI index value and the specified FA-HA pair.

If the AAA Server 17 receives a request from the Home Agent 28 for a security association using an invalid SPI value, the AAA Server 17 must send a rejection message or an invalid SPI indication back to the Home Agent 28. No dynamically allocated security association parameters can be assigned or communicated in a failed or rejected response message. Old SPI and security association parameters must be ignored once the new security association parameters are dynamically allocated by the AAA Server 17, but the AAA Server 17 can possess the capability to store old security association parameters to check for conflicts between old and new security association parameters. The old security parameters and index values may also be helpful in acquiring new security parameters and index values from the AAA Server 17. When stored, the newest generated security parameters and SPI index values will support the security association between the Foreign Agent 58 and the Home Agent 28.

The only exception to the requirement to dynamically allocate new security parameters and a new SPI index value is when the Home Agent 28 is dynamically allocated (not specified) in the access request message sent from the Foreign Agent 58. This situation occurs when the Mobile Node 64 sends a registration request message to the Foreign Agent 58 without identifying the address of the Home Agent 28. In this instance, the Foreign Agent 58 may not know the identity or address of the Home Agent 28 when the Foreign Agent 58 makes its access request to the Home Network AAA Server 17. In that event, the Foreign Agent 58 can ask the AAA Server 17 about the Home Agent 28 and for a security context for Foreign Agent-Home Agent pairing. In response to that request for information, the AAA Server 17 will send the Foreign Agent 58 a new allocation of security association parameters and a new SPI index value if there has been no previous allocation. If there has been a previous allocation for the HA and SA security association, then an SPI index value previously allocated will be returned for the FA.

The Message Sequencing in the Present Invention

Figure 2:
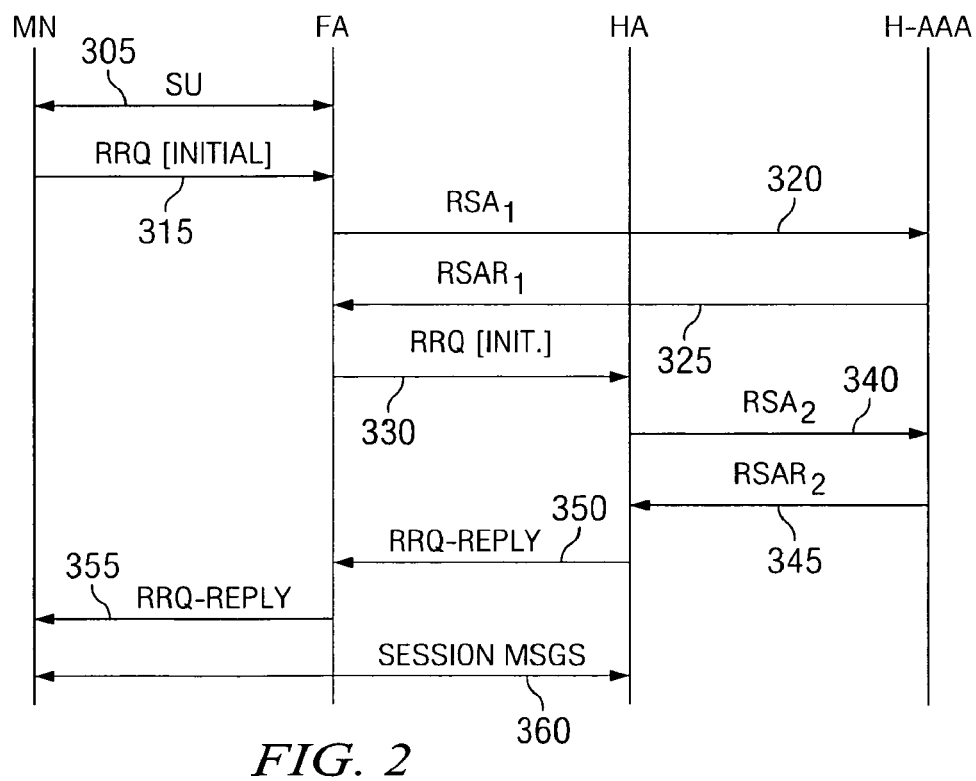
FIG. 2 is a diagram of the message sequence used in the present invention.

FIG. 2 is a message flow chart in accordance with the present invention. A Link Layer Set Up message (SU) sequence 305 is communicated between Mobile Node 64 and the Foreign Agent (FA) 58. After the Mobile Node 64 communicates with the Foreign Agent 58 in the messaging 305, the Mobile Node 64 send a Registration Request Message (RRQ) to the Foreign Agent 58 at message 315. This registration request will possess the care-of address needed for the Home Agent 28 to forward information packets to the Mobile Node 64.

Prior to sending the Registration Request Message onto the Home Agent 28, the Foreign Agent communicates at message 320 with the H-AAA Server 17 on the Home Network 10. The communication 320 to the H-AAA Server 17 is the access Request ($RSA_1$) to establish a security association between the Foreign Agent 58 and the Home Agent 28. This access request ($RSA_1$) 320 will include a request to establish a specific security association between the Foreign Agent 58 and the Home Agent 28, with the H-AAA Server 17 being requested to dynamically allocate specific security parameters needed to establish the requested security association. These requested parameters may include a FA-HA shared secret key or a public/private key pair, an authentication algorithm and mode, a FA-HA secret key lifetime, a replay protection mechanism (if necessary), security parameter index (SPI) or security index values, as well as any other needed parameters that can be defined in the future.

The H-AAA Server 17 may respond with an access reject message if the request is invalid or some other portion of the request is improper. Assuming the request for a security association is proper, the H-AAA Server 17 responds to the access request message ($RSA_1$) 320 with an access accept message ($RSAR_1$) at message 325. This access accept message ($RSAR_1$) at message 325 will include the requested security association parameters including an security parameter index value (SPI) of SPI=SPI1. Secret key information can be included in message 325.

After the Foreign Agent receives the access accept message ($RSAR_1$) at message 325, the Foreign Agent 58 forwards the initial registration request message (RRQ) to the Home Agent (HA) at message 330. The message 330 will include an Authentication Extension with some of the additional security association parameters and security parameter index (SPI) values received from the H-AAA Server 17 in message 325.

The Home Agent 28 receives the initial registration request message (RRQ) at message 330, and transmits an access request message ($RSA_2$) 330 to the H-AAA Server 17 with a request for the disclosure of the security association values and the security parameter index (SPI) values dynamically allocated by the H-AAA Server 17 and sent to the Foreign Agent 58 in message 325. The access request message ($RSA_2$) 330 allows the H-AAA Server 17 to authenticate and confirm the authenticity of the Home Agent 28 identity and the H-AAA Server 17 provides the requested security association parameters to the Home Agent 28 in an access accept message ($RSAR_2$) sent from the H-AAA Server 17 to the Home Agent 28 at message 345. The H-AAA Server 17 includes additional security information in the access accept message ($RSAR_2$) sent to the Home Agent 28 in message 345, such as security parameter values and secret key information that will allow the Home Agent 28 and the Foreign Agent 58 to encrypt and decrypt messaging between those entities.

The Home Agent 28 receives the access accept message ($RSAR_2$), which allows it to authenticate the registration request (RRQ) initially received from the Mobile Node 64 through the Foreign Agent 58. The Home Agent transmits a registration response (RRQ-Reply) message 350 to the Foreign Agent after this confirmation and authentication. The Foreign Agent authenticates the registration response (RRQ-Reply) message 350 and transmits the registration response reply message (RRQ-Reply) 355 after that confirmation and authentication. Following the receipt of message 350, the Mobile Node 64 is registered and there are secure communication pathways established between the Mobile Node 64, Foreign Agent 58 and Home Agent 28. The session is registered and the Mobile Node 64 can communicate is a secure manner with the Home Agent 28.

While the invention has been particularly shown and described with respect to preferred embodiments, it will be readily understood that minor changes in the details of the invention may be made without departing from the spirit of the invention.

Having described the invention, we claim:

1. A method for establishing a secure communication pathway between a mobile node and a home agent on a home network, comprising the steps of:
    receiving a registration request at a foreign agent on a foreign network from said mobile node located on said foreign network, said registration request including care-of addressing information to establish a communication pathway between the mobile node and the home agent located on the home network;
    transmitting an access request from the foreign agent to a home network AAA server located on the home network with a security association request for a specified foreign agent-home agent pairing, said home network AAA server dynamically allocating security parameters to support the security association request;
    receiving an access response at the foreign agent from the home network AAA server which includes the dynamically allocated security parameter information generated by the home network AAA server;
    transmitting the registration request to the home agent from the foreign agent including a selected portion of the security parameters received by the foreign agent, said home agent receiving the dynamically allocated security parameter information separately from the home network AAA server after receiving the registration request;
    receiving a registration response at the foreign agent from the home agent after confirmation of the foreign agent-home agent security association information, said registration response being provided to the mobile node to establish the communication pathway between the home agent and the mobile node.

2. The method of claim 1, wherein the home network AAA server dynamically allocates the security parameter information including an SPI index value each time the foreign agent requests a security association for a specific home agent-foreign agent pairing.

3. The method of claim 2, wherein old SPI index values will be considered invalid if those values do not match the dynamically allocated SPI index values issued by the home network AAA server.

4. The method of claim 1, wherein the home network AAA server dynamically allocates the security parameters each time the foreign agent requests a security association for a specific home agent-foreign agent pairing even though there is an existing security association for that home agent-foreign agent pairing.

5. The method of claim 1, wherein security parameters that are dynamically allocated include a foreign agent-home agent shared secret key or a public/private key pair.

6. The method of claim 1, wherein security parameters that are dynamically allocated include an authentication algorithm and mode.

7. The method of claim 1, wherein security parameters that are dynamically allocated include a foreign agent-home agent secret key lifetime.

8. A foreign agent node in a foreign communication network, comprising:
    communication logic configured to communicate with a mobile node and a home network of the mobile node;
    processing logic, wherein the processing logic is configured to:
        receive a registration request from the mobile node located on the foreign communication network using the communication logic, the registration request including care-of addressing information to establish a communication pathway between the mobile node and a home agent located on the home network;
        transmit an access request a home network AAA server located on the home network with a security association request for a specified foreign agent-home agent pairing using the communication logic, wherein the home network AAA server is configured to dynamically allocate security parameters to support the security association request;

receive an access response from the home network AAA server using the communication logic, wherein the access response includes the dynamically allocated security parameter information generated by the home network AAA server;

transmit the registration request to the home agent using the communication logic, wherein the registration request includes a selected portion of the security parameters received by the foreign agent, and wherein the home agent is configured to receive the dynamically allocated security parameter information separately from the home network AAA server after receiving the registration request;

receive a registration response from the home agent using the communication logic, wherein said receiving the registration response is performed after confirmation of the foreign agent-home agent security association information, wherein the registration response is usable to establish the communication pathway between the home agent and the mobile node.

9. The foreign agent node of claim 8, wherein the home network AAA server dynamically allocates the security parameter information including an SPI index value each time the foreign agent requests a security association for a specific home agent-foreign agent pairing.

10. The foreign agent node of claim 9, wherein old SPI index values are considered invalid if those values do not match the dynamically allocated SPI index values issued by the home network AAA server.

11. The foreign agent node of claim 8, wherein the home network AAA server dynamically allocates the security parameters each time the foreign agent requests a security association for a specific home agent-foreign agent pairing even though there is an existing security association for that home agent-foreign agent pairing.

12. The foreign agent node of claim 8, wherein security parameters that are dynamically allocated include a foreign agent-home agent shared secret key or a public/private key pair.

13. The foreign agent node of claim 8, wherein security parameters that are dynamically allocated include an authentication algorithm and mode.

14. The foreign agent node of claim 8, wherein security parameters that are dynamically allocated include a foreign agent-home agent secret key lifetime.

15. A method for establishing a secure communication pathway between a mobile node and a home agent on a home network, comprising the steps of:

a home network AAA server receiving an access request from a foreign agent on a foreign network with a security association request for a specified foreign agent-home agent pairing, wherein the access request is received in response to a registration request at the foreign agent by the mobile node located on the foreign network, wherein the registration request comprises care-of addressing information to establish a communication pathway between the mobile node and the home agent located on the home network;

the home network AAA server dynamically allocating security parameters to support the security association request;

the home network AAA server providing an access response to the foreign agent which includes the dynamically allocated security parameter information generated by the home network AAA server, wherein the foreign agent is configured to transmit the registration request to the home agent from the foreign agent including a selected portion of the security parameters received by the foreign agent;

the home network AAA server separately transmitting the dynamically allocated security parameter information to the home agent after receiving the registration request, wherein the home agent is configured to provide a registration response to the foreign agent after confirmation of the foreign agent-home agent security association information, wherein the registration response is usable to establish the communication pathway between the home agent and the mobile node.

16. The method of claim 15, wherein the home network AAA server dynamically allocates the security parameter information including an SPI index value each time the foreign agent requests a security association for a specific home agent-foreign agent pairing.

17. The method of claim 16, wherein old SPI index values will be considered invalid if those values do not match the dynamically allocated SPI index values issued by the home network AAA server.

18. The method of claim 15, wherein the home network AAA server dynamically allocates the security parameters each time the foreign agent requests a security association for a specific home agent-foreign agent pairing even though there is an existing security association for that home agent-foreign agent pairing.

19. The method of claim 15, wherein security parameters that are dynamically allocated include a foreign agent-home agent shared secret key or a public/private key pair.

20. The method of claim 15, wherein security parameters that are dynamically allocated include an authentication algorithm and mode.

21. The method of claim 15, wherein security parameters that are dynamically allocated include a foreign agent-home agent secret key lifetime.

22. A home network AAA server of a home communication network, comprising:

communication logic configured to communicate with a foreign agent of a foreign communication network and a home agent of the home communication network;

processing logic, wherein the processing logic is configured to:

receive an access request from a foreign agent on the foreign communication network using the communication logic, wherein the access request includes a security association request for a specified foreign agent-home agent pairing, wherein the access request is received in response to a registration request at the foreign agent by the mobile node located on the foreign communication network, wherein the registration request comprises care-of addressing information to establish a communication pathway between the mobile node and the home agent located on the home network;

dynamically allocate security parameters to support the security association request;

provide an access response to the foreign agent using the communication logic, wherein the access response comprises the dynamically allocated security parameter information generated by the home network AAA server, wherein the foreign agent is configured to transmit the registration request to the home agent from the foreign agent including a selected portion of the security parameters received by the foreign agent;

separately transmit the dynamically allocated security parameter information to the home agent after receiving the registration request using the communication logic, wherein the home agent is configured to provide a registration response to the foreign agent after confirmation of the foreign agent-home agent security association information, wherein the registration response is usable to establish the communication pathway between the home agent and the mobile node.

23. The home network AAA server of claim 22, wherein the home network AAA server dynamically allocates the security parameter information including an SPI index value each time the foreign agent requests a security association for a specific home agent-foreign agent pairing.

24. The home network AAA server of claim 23, wherein old SPI index values will be considered invalid if those values do not match the dynamically allocated SPI index values issued by the home network AAA server.

25. The home network AAA server of claim 22, wherein the home network AAA server dynamically allocates the security parameters each time the foreign agent requests a security association for a specific home agent-foreign agent pairing even though there is an existing security association for that home agent-foreign agent pairing.

26. The home network AAA server of claim 22, wherein security parameters that are dynamically allocated include a foreign agent-home agent shared secret key or a public/private key pair.

27. The home network AAA server of claim 22, wherein security parameters that are dynamically allocated include an authentication algorithm and mode.

28. The home network AAA server of claim 22, wherein security parameters that are dynamically allocated include a foreign agent-home agent secret key lifetime.

* * * * *